United States Patent
Goto (10) Patent No.: US 8,327,584 B2
(45) Date of Patent: Dec. 11, 2012

(54) GLASS RUN CHANNEL

(75) Inventor: Yoshinori Goto, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 0 days.

(21) Appl. No.: 13/070,839

(22) Filed: Mar. 24, 2011

(65) Prior Publication Data

US 2011/0308170 A1 Dec. 22, 2011

(30) Foreign Application Priority Data

Jun. 21, 2010 (JP) ................ P2010-140385
Dec. 28, 2010 (JP) ................ P2010-293104

(51) Int. Cl.
*E05D 15/16* (2006.01)
(52) U.S. Cl. ........................................ 49/441
(58) Field of Classification Search .......... 49/440, 49/441, 475.1, 495.1, 490.1; 428/316.6, 428/314.4
See application file for complete search history.

(56) References Cited

U.S. PATENT DOCUMENTS

| | | | | |
|---|---|---|---|---|
| 3,939,608 A * | 2/1976 | Asakai et al. | ........... | 49/493.1 |
| 5,398,451 A * | 3/1995 | Mesnel | ........... | 49/479.1 |
| 5,493,814 A * | 2/1996 | Christian | ........... | 49/479.1 |
| 5,628,150 A * | 5/1997 | Mesnel | ........... | 49/440 |
| 6,023,888 A * | 2/2000 | Dover | ........... | 49/441 |
| 6,389,754 B2 * | 5/2002 | Nozaki | ........... | 49/441 |
| 6,681,526 B2 * | 1/2004 | Mueller et al. | ........... | 49/440 |
| 6,708,450 B2 * | 3/2004 | Tanaka et al. | ........... | 49/441 |
| 7,055,285 B2 * | 6/2006 | Nozaki | ........... | 49/479.1 |
| 7,172,239 B2 * | 2/2007 | Nozaki et al. | ........... | 296/146.9 |
| 7,294,386 B2 * | 11/2007 | Murase et al. | ........... | 428/99 |
| 7,316,097 B2 * | 1/2008 | Shiraiwa et al. | ........... | 49/441 |
| 7,762,614 B2 * | 7/2010 | Kubo et al. | ........... | 296/146.2 |
| 2001/0001916 A1 * | 5/2001 | Nozaki | ........... | 49/414 |
| 2001/0013203 A1 * | 8/2001 | Griesbach et al. | ........... | 49/440 |
| 2001/0015035 A1 * | 8/2001 | Nozaki | ........... | 49/440 |
| 2002/0046499 A1 * | 4/2002 | Nozaki et al. | ........... | 49/441 |
| 2004/0134132 A1 * | 7/2004 | Baumann | ........... | 49/441 |
| 2004/0237412 A1 * | 12/2004 | Aritake et al. | ........... | 49/441 |
| 2005/0120633 A1 * | 6/2005 | Takase et al. | ........... | 49/441 |
| 2006/0064936 A1 * | 3/2006 | Shiraiwa et al. | ........... | 49/441 |
| 2006/0248802 A1 * | 11/2006 | Tamaoki et al. | ........... | 49/441 |
| 2006/0258793 A1 * | 11/2006 | Nonaka et al. | ........... | 524/495 |
| 2007/0175101 A1 * | 8/2007 | Kanehara et al. | ........... | 49/441 |

(Continued)

FOREIGN PATENT DOCUMENTS

JP   A 11-180157   7/1999
JP   A 2002-002303   1/2002

*Primary Examiner* — Katherine W Mitchell
*Assistant Examiner* — Justin Rephann
(74) *Attorney, Agent, or Firm* — Oliff & Berridge, PLC (57) ABSTRACT

A glass run channel, wherein at least one of interior and exterior side wall portions are made of a foamable polymer material that is foamed, wherein at least one of an interior covering layer that covers at least a portion of a first surface, which includes a surface of an interior decoration portion and a surface of an interior connecting portion, and an exterior covering layer that covers at least a portion of a second surface, which includes a surface of an exterior decoration portion and a surface of an exterior connecting portion, is formed, so as to cover the at least one decoration portion that is made of the foamable polymer material, and wherein the at least one covering layer is made of a second polymer material which has a foaming ratio smaller than that of the foamable polymer material or which is not foamed.

10 Claims, 5 Drawing Sheets

U.S. PATENT DOCUMENTS

| | | | |
|---|---|---|---|
| 2007/0251152 A1* | 11/2007 | Takase et al. | 49/441 |
| 2008/0207786 A1* | 8/2008 | Suzuki et al. | 521/89 |
| 2009/0278379 A1* | 11/2009 | Tamura | 296/146.2 |
| 2010/0026042 A1* | 2/2010 | Ellis et al. | 296/146.2 |

* cited by examiner

GLASS RUN CHANNEL

CROSS-REFERENCE TO RELATED APPLICATIONS

This application claims priority from Japanese Patent Application No. 2010-140385 filed on Jun. 21, 2010, and from Japanese Patent Application No. 2010-293104 filed on Dec. 28, 2010, the entire contents of which are incorporated herein by reference.

TECHNICAL FIELD

The present invention relates to a glass run channel that is used in a front door or a rear door of a vehicle.

BACKGROUND

For example, a glass run channel, which is mounted on a run mounting portion of a window frame that is provided at a front door or a rear door of a vehicle and which guides moving up and down of a windowpane, is made of a rubber material or another polymer material (for example, thermoplastic elastomer material).

In the glass run channel, generally, a glass run channel main body that forms a main part of the glass run channel includes a base bottom portion, an interior side wall portion and an exterior side wall portion, an interior side seal lip and an exterior side seal lip which elastically contacts each surfaces of the windowpane respectively, and an interior decoration portion and an exterior decoration portion which project toward an opposite side of each seal lip.

Related art discloses a glass run channel having a structure in which a covering layer is formed at surfaces of both the interior and the exterior decoration portions, so as to improve the decorative aspect.

In the related-art glass run channel, the covering layers, which are made of a material other than the decoration portions, are formed at the surfaces of both the interior and the exterior decoration portions, so as to form a two-layer structure. Thus, a difference in the contraction degree occurs respectively between the interior and the exterior decoration portions and each of the covering layers, and this causes both the interior and the exterior decoration portions including the covering layers to be deformed in an opening direction. In this case, gaps occur between both the interior and the exterior decoration portions including covering layers, and the window frame, thereby decreasing visual quality.

SUMMARY

Accordingly, a glass run channel, in which the deformation of at least one of the interior and the exterior decoration portions including the covering layer is suppressed, is provided.

According to an aspect of the present invention, there is provided a glass run channel having an elongated shape, which is mounted on a run mounting portion of a window frame of a vehicle door, guides moving up and down of a windowpane and is made of a polymer material, the glass run channel comprising: a run channel main body that forms a main part of the glass run channel, the run channel main body including, a base bottom portion which is provided at a position facing an end surface of the windowpane, an interior side wall portion which extends from a width end of the base bottom portion, an exterior side wall portion which extends from another width end of the base bottom portion, an interior seal lip which project toward the base bottom portion from an opening side end of the interior side wall portion and elastically contacts a first surface of the windowpane, an exterior seal lip which project toward the base bottom portion from an opening side end of the exterior side wall portion and elastically contacts a second surface of the windowpane, an interior decoration portion which project from the opening side end of the interior side wall portion toward an opposite side of the interior seal lip, and an exterior decoration portion which project from the opening side end of the exterior side wall portion toward an opposite side of the exterior seal lip, wherein at least one of the interior side wall portion and the exterior side wall portion is made of a foamable polymer material that is foamed, wherein an interior connecting portion connects the interior decoration portion and the interior seal lip, wherein an exterior connecting portion connects the exterior decoration portion and the exterior seal lip, wherein at least one of an interior covering layer that covers at least a portion of a first surface of the run channel main body, the first surface including a surface of the interior decoration portion and a surface of the interior connecting portion, and an exterior covering layer that covers at least a portion of a second surface of the run channel main body, the second surface including a surface of the exterior decoration portion and a surface of the exterior connecting portion, is formed, so as to cover a portion of the at least one decoration portion that is made of the foamable polymer material, and wherein the at least one covering layer is made of a second polymer material which has a foaming ratio smaller than that of the foamable polymer material or which is not foamed.

DETAILED DESCRIPTION

Modes for carrying out the invention will be described with respect to the exemplary embodiments.

First Exemplary Embodiment

The first exemplary embodiment of the invention will be described with reference to FIGS. 1 to 3.

Figure 1:
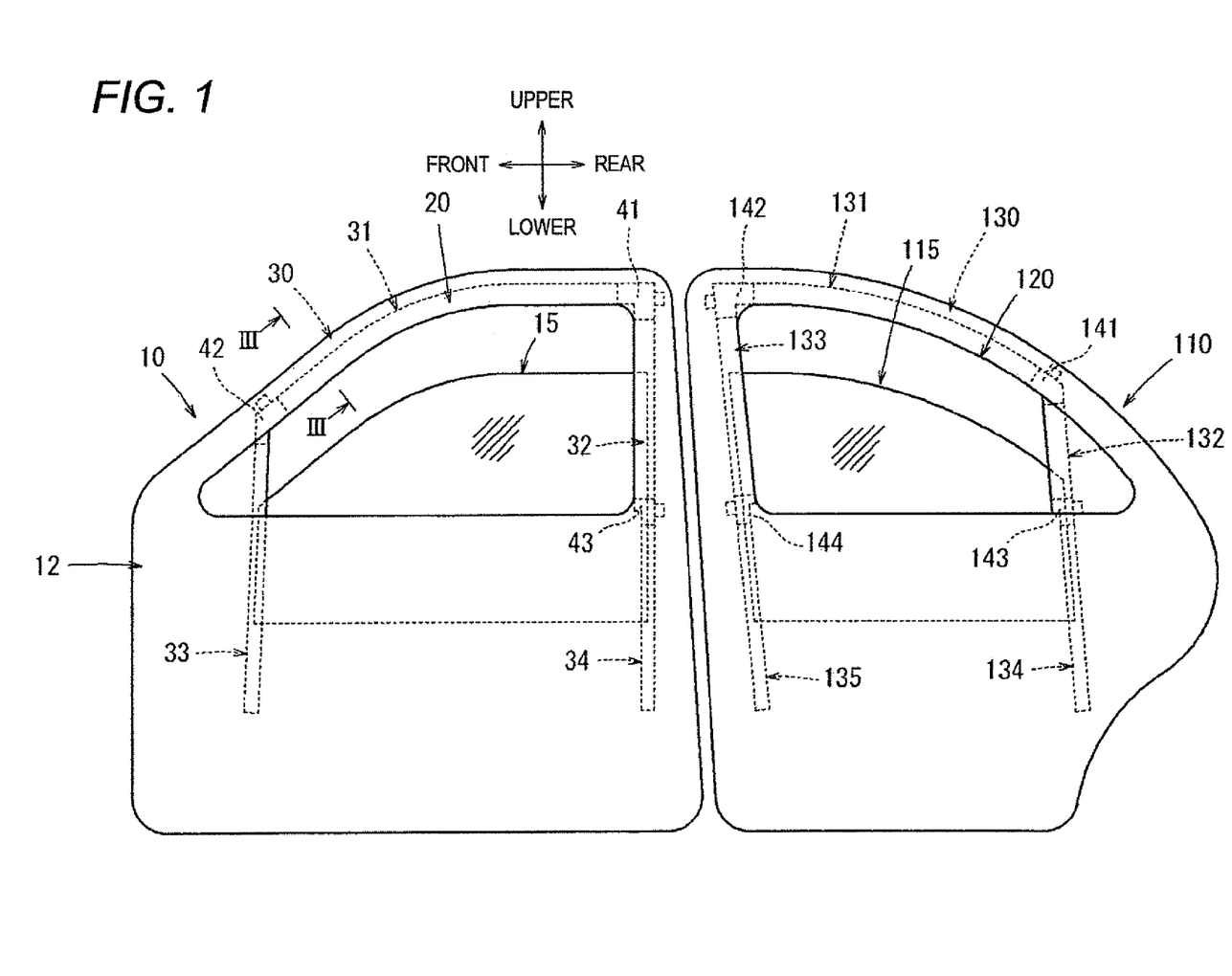
FIG. 1 is a side view schematically illustrating a state in which glass run channel assemblies, which use glass run channels according to a first exemplary embodiment of the invention, are provided at a window frame of a front door and a window frame of a rear door respectively.

As shown in FIG. 1, a window frame 20 is integrally formed at a door panel 12 that forms a front door 10 as a vehicle door.

A run mounting portion 25 is formed at the window frame 20. The run mounting portion 25 is formed by an outer panel 13 and an inner panel 14 which constitute the door panel 12 in a step shape which an opening side is narrow and an inner side is wide (see FIG. 3).

Figure 2:
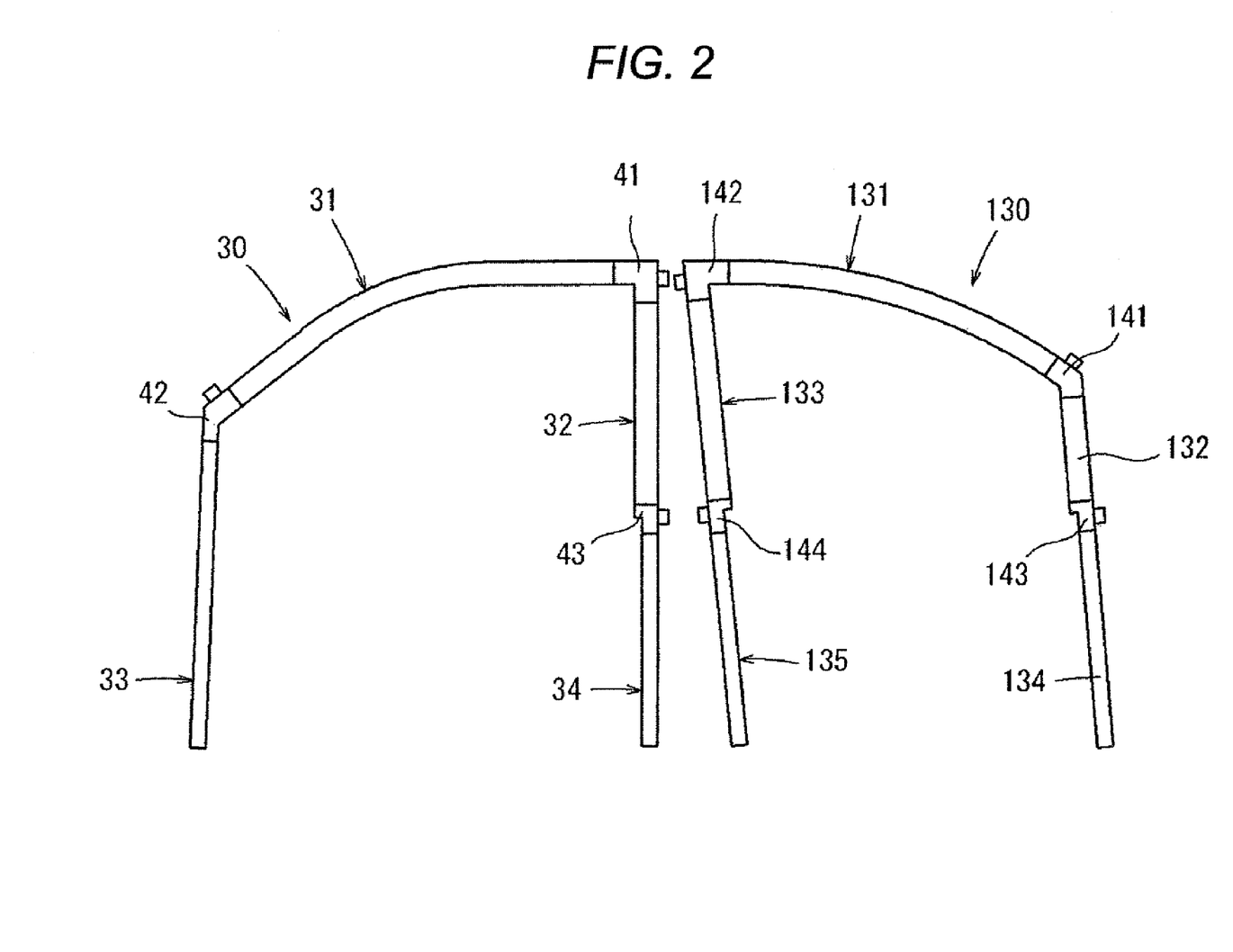
FIG. 2 is a side view illustrating the glass run channel assemblies.

As shown in FIGS. 1 and 2, a front side glass run channel assembly 30 is mounted on the window frame 20 of the front door 10 as the vehicle door so as to guide a moving up and down operation of a windowpane 15. The front side glass run channel assembly 30 has an elongated shape and is made of polymer material (thermoplastic elastomer material). The glass run channel assembly 30 has first to fourth glass run channels 31, 32, 33 and 34 which are formed as elongated shapes by extrusion molding, and first to third connecting bodies 41, 42, and 43 which are formed by injection molding.

The first glass run channel 31 is mounted along an upper side portion and a front oblique side portion of the front door 10.

An upper end of the second glass run channel 32 is connected to a rear end of the first glass run channel 31 by the first connecting body (the corner connecting body) 41. The second glass run channel 32 is mounted along a rear vertical edge portion of the front door 10.

An upper end of the third glass run channel 33 is connected to a front end of the first glass run channel 31 by the second connecting body (the corner connecting body) 42. The third glass run channel 33 is mounted along the front vertical frame portion which extends from a rear edge of a front quarter window of the front door 10 to the inside of the door.

A lower end of the second glass run channel 32 is arranged within the door and an upper end of the fourth glass run channel 34 is connected to the lower end of the second glass run channel 32 by the third connecting body 43. The fourth glass run channel 34 is mounted along the rear vertical frame portion within the door.

Figure 3:
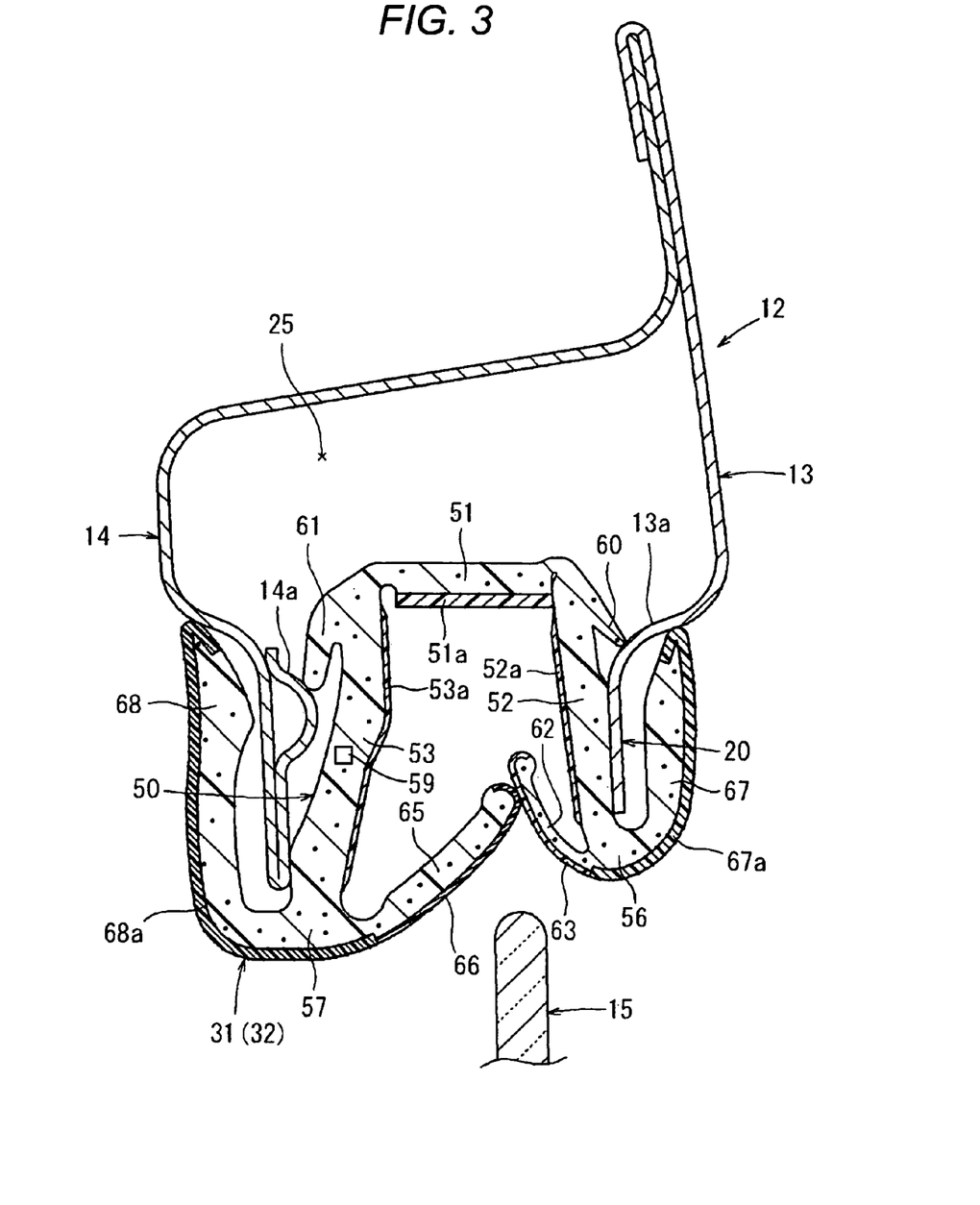
FIG. 3 is a cross sectional view taken along line III-III in FIG. 1, illustrating the glass run channel.

Among the first to fourth glass run channels 31 to 34 which constitute the front side glass run channel assembly 30, the first glass run channel 31 is constituted by an extrusion molding product having a cross-sectional shape as shown in FIG. 3.

A run channel main body 50 that forms a main part of the first glass run channel 31 includes a base bottom portion 51 that is provided at a position that faces an end surface of the windowpane 15, an exterior side wall portion 52 which extends from a width end of the base bottom portion and an interior side wall portion 53 which extends from another width end of the base bottom portion 51. The exterior side wall portion 52 and the interior side wall portion 53 constitute a recess in which a peripheral portion of the windowpane 15 can be lifted and lowered. Further, the run channel main body 50 includes an exterior seal lip 62 and an interior seal lip 65. The exterior seal lip 62 projects toward the base bottom portion 51 from an exterior connecting portion 56 which is an opening side end of the exterior side wall portion 52. The interior seal lip 65 projects toward the base bottom portion 51 from an interior connecting portion 57 which is an opening side end of the interior side wall portion 53. The exterior seal lip 62 and the interior seal lip 65 is configured to elastically contact each surfaces of the windowpane 15 respectively.

Further, the run channel main body 50 may include an exterior decoration portion 67, an interior decoration portion 68, or both. The exterior decoration portion 67 projects from the exterior connecting portion 56 and the interior decoration portion 68 projects from the interior connecting portion 57. The exterior decoration portion 67 projects toward an opposite side of the exterior seal lip 62 and is formed in a folded shape along the exterior side wall portion 52. The interior decoration portion 68 projects toward an opposite side of the interior seal lip 65 and is formed in a folded shape along the interior side wall portion 53.

In other words, the exterior connecting portion 56 and the interior connecting portion 57 are connected between the exterior decoration portion 67 and the exterior seal lip 62, and between the interior decoration portion 68 and the interior seal lip 65 respectively.

Each of the decoration portions 67 and 68, and each of the seal lips 62 and 65 have a bending point (typically, the thinnest portion near the root portion) that becomes a center of deformation. The exterior connecting portion 56 is integrally formed with the exterior decoration portion 67 and the exterior seal lip 62 in which the bending points is a boundary. The interior connecting portion 57 is integrally formed with the interior decoration portion 68 and the interior seal lip 65 in which the bending points is a boundary.

The run channel main body 50 has a foamed part that is made of a foamable polymer material that is foamed.

It is preferred that a foaming ratio of the run channel main body 50 is 1.20 to 1.80 so as to secure a reduction in weight and a sufficient strength.

It is preferred that 0.5 to 2.0 parts by weight of the thermal expansion capsules 59 are mixed to 100 parts by weight of the thermoplastic elastomer material in the foamable polymer material that forms the run channel main body 50.

It is further preferred that 1.0 parts by weight of the thermal expansion capsules 59 are mixed to 100 parts by weight of the thermoplastic elastomer material in the foamable polymer material that forms the run channel main body 50.

It is preferred that the run channel main body 50 is formed such that the inner foaming cells inside thereof are closed cells that do not communicate with external air. It is further preferred that the foaming cells are closed cells that do not communicate with each other inside the run channel main body 50.

It is preferred that the specific gravity of the run channel main body 50 is 0.50 to 0.80. It is further preferred that the specific gravity is 0.55 to 0.75, and even more preferred that the specific gravity is 0.65.

As the thermoplastic elastomer material that is a main component of the run channel main body 50, for example, a material is made by mixing EPDM (ethylene-propylene-diene copolymer) and PP (polypropylene), and then mixing additives such as a plasticizer or a colorant thereto.

Also, as the thermal expansion capsules 59, for example, thermo expandable capsules (trade name of ADVANCELL, manufactured by SEKISUI CHEMICAL CO., LTD., average particle diameter: 22 μm to 32 μm, expansion start temperature: 160 degrees Celsius to 180 degrees Celsius, all from a catalogue) are used.

In the run channel main body 50, an exterior covering layer 67a is formed at a surface that is from an end portion of the exterior decoration portion 67 to the exterior connecting portion 56, so as to cover the surface, and an interior covering layer 68a is formed at a surface that is from an end portion of the interior decoration portion 68 to the interior connecting portion 57, so as to cover the surface.

The exterior covering layer 67a of the exterior decoration portion 67 and the interior covering layer 68a of the interior decoration portion 68 are made of a second polymer material which has a foaming ratio smaller than that of the foamable polymer material that forms the run channel main body 50 or which is not foamed. For example, the second polymer material is a same kind of material as the thermoplastic elastomer material for forming the foamable polymer material, which does not include expansion capsules.

In the first exemplary embodiment, the exterior covering layer 67a is formed extending in a folded shape beyond the end portion of the exterior decoration portion 67 to a rear surface, and the interior covering layer 68a is formed extending in a folded shape beyond the end portion of the interior decoration portion 68 to a rear surface.

Also, the exterior covering layer 67a may cover a range from the exterior decoration portion 67 to the middle of the surface of the exterior connecting portion 56, and the interior covering layer 68a may cover a range from the interior decoration portion 68 to the middle of the surface of the interior connecting portion 57. However, it is preferred that they cover the entire surfaces of each of the connecting portions 56 and 57.

In the first exemplary embodiment, an exterior low friction layer 63 is formed at a surface of the exterior seal lip 62 that contacts the windowpane 15, and an interior low friction layer 66 is formed at a surface of the interior seal lip 65 which contacts the windowpane 15. The low friction layers 63 and 66 are formed by a co-extrusion (two-color molding) with the extrusion molding of the run channel main body 50, by using a material, which is the same kind of material as the material of the run channel main body 50 or a material which is miscible with the material of the run channel main body, and which is a low friction material, (the thermoplastic elastomer material or the thermoplastic resin material), that is, a coefficient of kinetic friction of the material, with respect to the windowpane 15 or the door panel 12, is smaller than that of the foamable polymer material (the run channel main body 50) or the second polymer material (the exterior covering layer 67a and the interior covering layer 68a).

Both the exterior and the interior low friction layers 63 and 66 extend to near the root portions of the exterior and the interior seal lips 62 and 65 (a range that does not exceed the bending point).

It is preferred that the exterior low friction layers 63 is continuous with the exterior covering layer 67a, and the interior low friction layer 66 is continuous with the interior covering layer 68a.

Figure 4:
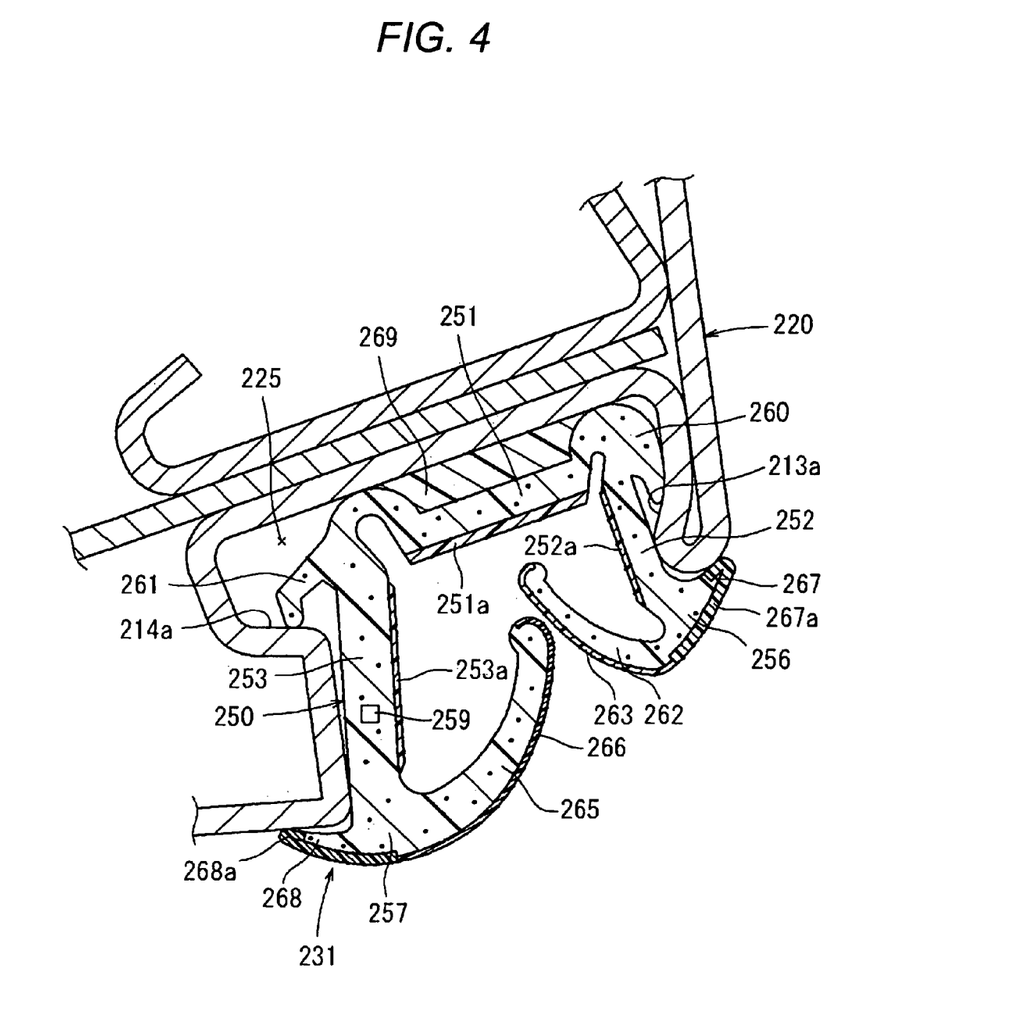
FIG. 4 is a cross sectional view illustrating a glass run channel according to a second exemplary embodiment of the invention.

In FIGS. 3 and 4, in order to make the boundary portions between the exterior and the interior low friction layers 63 and 66, and the exterior and the interior covering layers 67a and 68a clear, the thickness of each of the layers is illustrated emphatically by providing difference in the thickness of the layers.

It is preferred that the hardness of the run channel main body 50 that is made of the foamable polymer material after being foamed, and the exterior covering layer 67a and the interior covering layer 68a which are made of the second polymer material, are substantially the same degree. It is further preferred that the hardness (type A durometer hardness of K6253, JIS) of the exterior covering layer 67a and the interior covering layer 68a, which are made of the second polymer material, is A60 to A80.

In the first exemplary embodiment, low friction layers 52a, 53a, and 51a are made of a low friction material that has a coefficient of kinetic friction smaller than that of the material of the run channel main body 50. The low friction layers 52a, 53a, and 51a are formed even on mutually facing surfaces of the exterior side wall portion 52 and the interior side wall portion 53 of the run channel main body 50, and at a bottom surface of the base bottom portion 51. The low friction layers 52a, 53a, and 51a are formed by a co-extrusion (two-color molding) with the extrusion molding of the run channel main body 50.

The run channel main body 50 may include an exterior holding lip 60 having a lip shape, an interior holding lip 61 having a lip shape, or both. The exterior holding lip 60 is provided outside of an end portion of the exterior side wall portion 52 at the base bottom portion 51 side. The interior holding lip 61 is provided outside of an end portion of the interior side wall portion 53 at the base bottom portion 51 side. The exterior holding lip 60 and the interior holding lip 61 are inclined and projected from the exterior side wall portion 52 and the interior side wall portion 53 respectively. Further, the exterior holding lip 60 is elastically engaged and retained to an exterior step portion 13a of the window frame 20. The interior holding lip 61 is elastically engaged and retained to an interior step portion 14a of the window frame 20.

A run channel main body that forms the main part of the second, third, and fourth glass run channels 32, 33, and 34, among the first to fourth glass run channels 31 to 34 which constitute the front side glass run channel assembly 30, is constituted in the same manner as the run channel main body 50 that constitutes the main part of the first glass run channel 31 except that the cross-sectional shape thereof is different.

That is, the nm channel main body that forms the main part of the second, the third, and the fourth glass run channels 32, 33, and 34 are also made of the foamable polymer material that includes the thermoplastic elastomer material and the thermal expansion capsules 59, and have countless foaming cells which are formed by expansion of the thermal expansion capsules.

Among the first to fourth glass run channels 31 to 34, two or more glass run channels may have the same cross-sectional shape. For example, the second glass run channel 32 and the third glass run channel 33 may have the same cross-sectional shape.

As shown in FIGS. 1 and 2, a rear side glass run channel assembly 130 is mounted to the window frame 120 of the rear door 110 as the vehicle door and guide the moving up and down of the windowpane 115. The rear side glass run channel assembly 130 is formed in an elongated shape by polymer material (the thermoplastic elastomer material). The rear side glass run channel assembly 130 includes first to fifth glass run channels 131, 132, 133, 134, and 135 that are formed in the elongated shape by extrusion molding, and the first to the fourth connecting bodies 141, 142, 143, and 144 that are formed by injection molding.

The first glass run channel 131 is mounted along an upper edge portion of the rear door 110. An upper end of the second glass run channel 132 is connected to an rear end of the first glass run channel 131 by the first connecting body (the corner connecting body) 141. The second glass run channel 132 is provided along a rear periphery of a rear quarter window of the rear door 110.

An upper end of the third glass run channel 133 is connected to an front end of the first glass run channel 131 by the second connecting body (the corner connecting body) 142. The third glass run channel 133 is provided along a front vertical frame portion of the rear door 110.

An upper end of the fourth glass run channel 134 is connected to a lower end of the second glass run channel 132 by the third connecting body 143. The fourth glass run channel 134 is provided along a rear vertical frame portion within the door. Further, an upper end of the fifth glass run channel 135 is connected to a lower end of the third glass run channel 133 by the fourth connecting body 144. The fifth glass run channel 135 is provided along a front vertical frame portion within the door.

In the first exemplary embodiment, among the first to the fifth glass run channels 131 to 135 which constitute the rear side glass run channel assembly 130, the first glass run channel 131 is formed in the same structure as that of the first glass run channel 31 of the front side glass run channel assembly 30 (see FIG. 3).

The run channel main body that forms the main part of the second to the fifth glass run channels 132 to 135 which constitute the rear side glass run channel assembly 130 is constituted in the same manner as that of the run channel main body that forms the main part of the first glass run channel 131 except that the cross-sectional shape thereof is different.

The glass run channel of the first exemplary embodiment is constituted as described above.

Accordingly, the run channel main body 50 that forms the main part of the first to the fourth glass run channels 31 to 34 that constitute the front side glass run channel assembly 30, and forms the main part of the first to the fifth glass run channels 131 to 135 that constitute the rear side glass run channel assembly 130, are made of the foamable polymer material that includes the thermoplastic elastomer material and the thermal expansion capsule 59. Thus, the run channel main body 50 can be reduced in weight compared to the glass run channel made of rubber.

Further, at the surfaces of the exterior decoration portion 67 and the interior decoration portion 68 which are made of the foamable polymer material, the exterior covering layer 67a and the interior covering layer 68a are formed. The exterior covering layer 67a and the interior covering layer 68a are made of the second polymer material that has a foaming ratio smaller than that of the foamable polymer material or that is not foamed. Accordingly, the exterior decoration portion 67 and the interior decoration portion 68 which include the exterior covering layer 67a and the interior covering layer 68a can be prevented from deforming in an opening direction.

In other words, when the foamable polymer material is foamed and the run channel main body 50 is formed, the foamable polymer material (the run channel main body 50) is extended according to the expansion of the thermal expansion capsules 59 around the thermal expansion capsules 59 (foaming cells), in addition to the extension in the extrusion direction. The foamable polymer material is cooled and solidified in a state of extension. An extension degree of a molecular chain in the polymer material after molding of the run channel main body 50 in the foamed foamable polymer material is higher than in the polymer material that is not foamed. Also, a residual stress that remains in the polymer material in the foamed foamable polymer material is larger than in the polymer material that is not foamed.

If the heat or the stress or the like due to the moving up and down of the windowpane is repeatedly applied to the glass run channel (the glass run channel assembly) that is already marketed while the glass run channel is mounted and used at the run mounting portion of the window frame of the vehicle door (the front door or the rear door), the extended molecular chain of the foamable polymer material that forms the run channel main body 50 is returned to the original state that is more stable, and contracted. The whole glass run channel is also contracted.

Accordingly, if the exterior covering layer 67a and the interior covering layer 68a, which are made of the polymer material of which the extension degree of the molecular chain is lower and is more difficult to contract than the foamable polymer material, are formed so as to cover the surfaces of the exterior decoration portion 67 and the interior decoration portion 68 of the run channel main body 50 that is made of the foamable polymer material, the two portions contract more at the portion in which the extension degree of the molecular chain that is made of the foamable polymer material is higher. Thus, each of the decoration portions 67 and 68 (the rear surface side) contract larger than each of the covering layers 67a and 68a (the surface side). Thus, the deformation in the opening direction of the exterior decoration portion 67 and the interior decoration portion 68 can be suppressed.

Accordingly, the exterior decoration portion 67 that includes the exterior covering layer 67a and the interior decoration portion 68 that includes the interior covering layer 68a can be suppressed from deforming in the opening direction thereof, and the visual quality deteriorating due to a generation of a gap between the decoration portions 67, 68 and the door panel 12 (the window frame 20) can be prevented.

In the invention, if not otherwise specified, "the opening direction" is a direction in which an angle formed by the exterior decoration portion 67 and the exterior side wall portion 52 and an angle formed by the interior decoration portion 68 and the interior side wall portion 53 increases, respectively. In other words, "the opening direction" is a direction that the exterior decoration portion 67 and the interior decoration portion 68 are separated from a flange portion of the window frame 20.

Also, "a closing direction" is a direction in which an angle formed by the exterior decoration portion 67 and the exterior side wall portion 52 and an angle formed by the interior decoration portion 68 and the interior side wall portion 53 decreases, respectively. In other words, "the closing direction" is a direction in which the exterior decoration portion 67 and the interior decoration portion 68 gets closer to the flange portion of the window frame 20.

Figure 5:
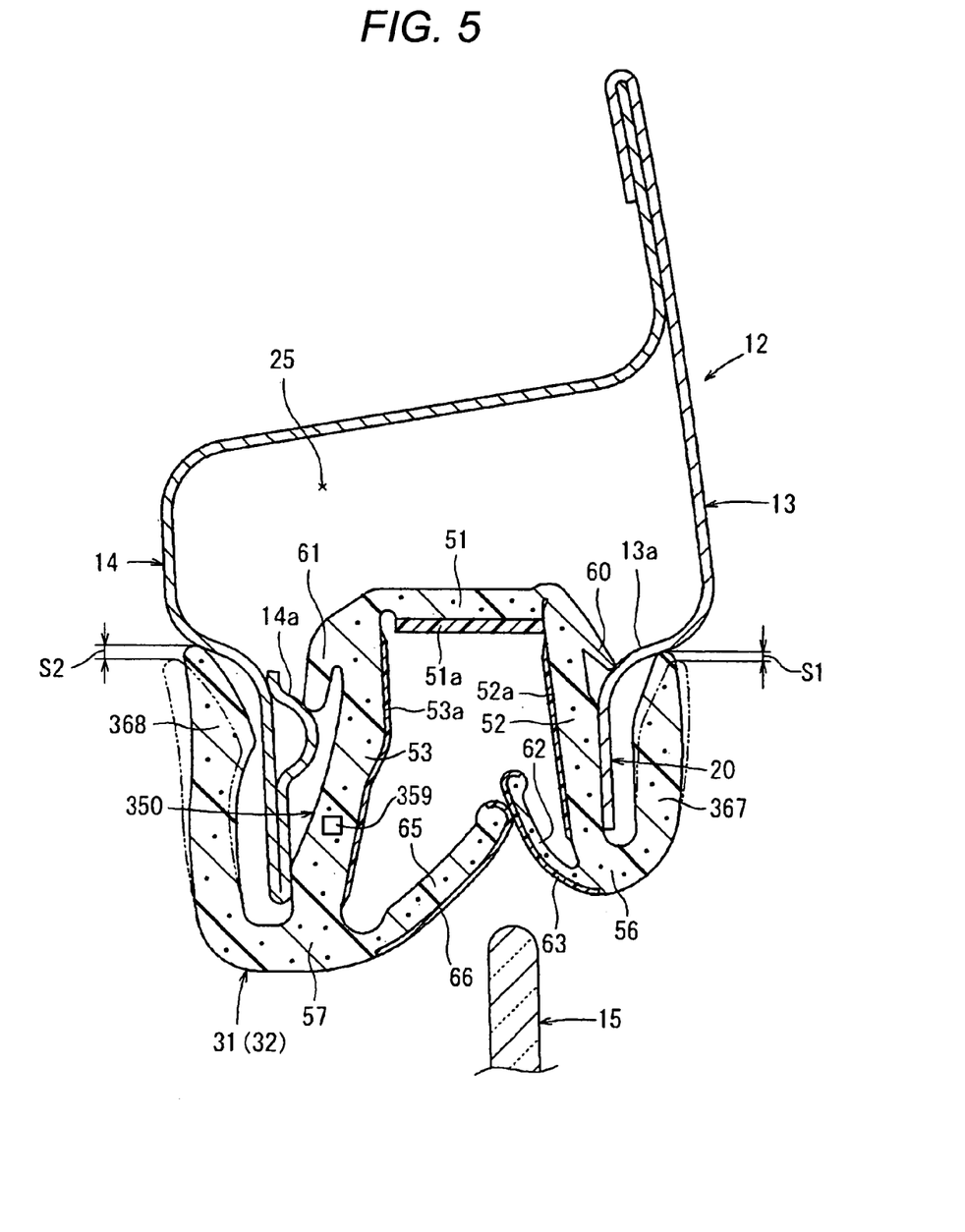
FIG. 5 is a cross sectional view of a glass run channel of a reference example.

Meanwhile, for example, as shown in FIG. 5, if covering layers are not formed at the surfaces of an exterior decoration portion 367 and an interior decoration portion 368 of a run channel main body 350 that is made of the foamable polymer material, the entirety of the exterior decoration portion 367 and the interior decoration portion 368 contracts without contracting in the closing direction.

Thus, as shown in a two-dot chain line in FIG. 5, the exterior decoration portion 367 and the interior decoration portion 368 of the run channel main body 350 are contracted and deformed in the opening direction and gaps S1 and S2 between the flange portion of the door panel 12 (the window frame 20) generates. Thus, there is a concern that the visual quality deteriorates.

In the glass run channel shown in FIG. 5, other configurations of the run channel main body 350 are configured in the same manner as that of the first exemplary embodiment so that the same reference numbers are given to the same components.

The difference of an amount of contraction depending on a change in temperature of the foamable polymer material and non-foamable polymer material was measured using two test pieces (the width of 50 mm, the thickness of about 2 mm, and the length of about 100 mm) for each material respectively.

First of all, the length (L0) of each of the test pieces before testing was measured respectively. As shown below in Table 1, the two test pieces of the foamable polymer material were 998.0 mm and 1001.0 mm, and the two test pieces of the non-foamable polymer material were 1001.0 mm and 1004.0 mm.

After that, each of the two test pieces underwent a temperature change from −30 degrees Celsius to 90 degrees Celsius at the atmosphere temperature for four cycles, and was repeatedly tested for over 56 hours. After the testing, the length (L1) of each of the two test pieces was measured respectively. As shown in Table 1, the two test pieces of the foamable polymer material were 993.0 mm and 995.5 mm, and the two test pieces of the non-foamable polymer material were 997.5 mm and 1005.5 mm.

Then, an individual contraction rate $((1-L1/L0) \times 100)$ of each of the two test pieces and an average value of the contraction rate were calculated.

As a result, in the two test pieces of the foamable polymer material, the contraction rates were 0.501% and 0.549%, and the average value was 0.53%.

Meanwhile, in the two test pieces of the non-foamable polymer material, the contraction rates were 0.350% and 0.349%, and the average value was 0.35%.

In other words, it was confirmed that the contraction amount depending on the temperature change of the foamable polymer material is grater than that of the non-foamable polymer material.

TABLE 1

| | Length before test (L0) [mm] | Length after test (L1) [min] | Shrinking rate (1 − L1/L0) × 100 [%] | Shrinking rate (average) [%] |
|---|---|---|---|---|
| Foamable polymer material | 998.0 1001.0 | 993.0 995.5 | 0.501 0.549 | 0.53 |
| Non-foamable polymer material | 1001.0 1004.0 | 997.5 1000.5 | 0.350 0.349 | 0.35 |

Further, a first test piece (the length of 100 mm) that has an inner layer made of the foamable polymer material and an outer layer made of the non-foamable polymer material, and forms a U-shape in the cross-section, and a second test piece (the length of 100 mm) that has an inner layer made of the non-foamable polymer material and an outer layer made of the non-foamable polymer material, and forms a U-shape in the cross-section, were manufactured respectively. The deformation state in the opening direction (here, it means the direction that the opening side of the opening in the U-shape of the cross-section) of the first test piece and the second test piece was tested.

In the test, first of all, the opening width (W0) at the center of the first test piece and the second test piece was measured. After the first test piece and the second test piece were heated under an atmospheric temperature of 80 degrees Celsius over 90 hours, the pieces were naturally cooled at room temperature (for example, 23 degrees Celsius), and then, the opening width (W1) of the first test piece and the second test piece were measured again. As a result, as shown in following Table 2, it was confirmed that in the first test piece, the inner layer of which is made of the foamable polymer material, there was hardly any deformation (W1−W0) in the opening direction.

Meanwhile, in the second test piece, the inner layer of which is made of the non-foamable polymer material, the deformation (W1−W0) in the opening direction was 1 mm.

TABLE 2

| No. | Main body portion | Covering material | W0 [mm] | W1 [mm] | W1 − W0 [mm] | State | Determination |
|---|---|---|---|---|---|---|---|
| 1 | Not foamed | Not foamed | 9 | 10 | 1 | Open | Not suitable |
| 2 | Foamed | Not foamed | 9 | 9 | 0 | No change | Suitable |

In the first exemplary embodiment, by adjusting the foaming ratio of the run channel main body 50 made of the foamable polymer material to 1.20 to 1.80, the exterior decoration portion 67 which include the exterior covering layer 67a and the interior decoration portion 68 which include the interior covering layer 68a can respectively be satisfactorily prevented from deforming in the opening direction.

In the first exemplary embodiment, in the foamable polymer material, 0.5 to 2.0 parts by weight of the thermal expansion capsules are mixed with 100 parts by weight of the thermoplastic elastomer material. Thus, a reduction in the weight can be satisfactorily performed.

That is, if the thermal expansion capsules 59 are less than 0.5 parts by weight, the weight reduction effect is decreased.

If the thermal expansion capsules 59 are more than 2.0 parts by weight, the foamable polymer material becomes an excessively foamed state and the rigidity and the tensile strength are decreased.

Furthermore, in the foamable polymer material, it is preferred that 1.0 part by weight of the thermal expansion capsules 59, 259 are mixed with 100 parts by weight of the thermoplastic elastomer material, so that the reduction in weight is further performed.

In the first exemplary embodiment, the exterior covering layer 67a is formed extending in a folded shape beyond the end portion of the exterior decoration portion 67 to a rear surface. Further, the interior covering layer 68a is formed extending in a folded shape beyond the end portion of the interior decoration portion 68 to a rear surface. Accordingly, the decoration surface (the surface that is visible when attached to the window frame 20) of the exterior decoration portion 67 and the interior decoration portion 68 is configured by the exterior covering layer 67a and the interior covering layer 68a, and the visual quality can be satisfactorily maintained.

In the first exemplary embodiment, the exterior low friction layer 63 is formed at the portion of the exterior seal lip 62 that contacts the windowpane, and the interior low friction layer 66 is formed at the portion of the interior seal lip 65 that contacts the windowpane 15. The exterior low friction layer 63 and the interior low friction layer 66 are made of the low friction material. The coefficient of kinetic friction of the low friction material, with respect to the windowpane 15 or the door panel 12 (the window frame 20), is smaller than that of the foamable polymer material that forms the run channel main body 50 or the second polymer material that forms the exterior covering layer 67a and the interior covering layer 68a. The exterior low friction layer 63 and the interior low friction layer 66 are extended to near the root portion from the front end portion of the exterior seal lip 62 and the interior seal lip 65.

The friction force when the windowpane 15 is moving up and down can be decreased by the exterior low friction layer 63 and the interior low friction layer 66. As a result, the stress that is applied to the run channel main body 50 (the glass run channel) when the windowpane 15 is moving up and down can be decreased. Further, the deformation of the exterior decoration portion 67 which include the exterior covering layer 67a and the interior decoration portion 68 which include the interior covering layer 68a, in the opening direction, can be more satisfactorily suppressed.

In the first exemplary embodiment, the exterior low friction layer 63 is continuous with the exterior covering layer 67a and the interior low friction layer 66 is continuous with the interior covering layer 68a so that the decoration surface can constitute a good visual quality without exposure of the foamable polymer material.

Since the hardness of the run channel main body 50 that is made of the foamable polymer material and the hardness of the exterior covering layer 67*a* and the interior covering layer 68*a* which are made of the second polymer material are a similar degree, the rigidity is not decreased even though the glass run channel main body is made of the foamable polymer material. Thus, the exterior decoration portion 67 which include the exterior covering layer 67*a* and the interior decoration portion 68 which include the interior covering layer 68*a* can be effectively prevented from deforming in the opening direction.

In the first exemplary embodiment, the exterior covering layer 67*a* and the interior covering layer 68*a*, which are made of the second polymer material, has a JISA hardness of A60 to A80. Accordingly, the decoration surfaces of the exterior covering layer 67*a* and the interior covering layer 68*a* are not easily whitened (a defect in which the color of the deformed portion is changed to a white color) and wrinkles are not easily formed. Thus, a fine decoration surface can be secured for a long term and the durability is excellent.

In other words, if the JISA hardness of the exterior covering layer 67*a* and the interior covering layer 68*a*, which are made of the second polymer material, is larger than A80, the surface of the covering layer is easily whitened. Meanwhile, if the JISA hardness of the exterior covering layer 67*a* and the interior covering layer 68*a*, which are made of the second polymer material, is smaller than A60, wrinkles are easily formed on the surface of the covering layer.

Second Exemplary Embodiment

Next, the second exemplary embodiment of the invention will be described referring to FIG. 4.

As shown in FIG. 4, in the second exemplary embodiment, an example is illustrated in which the window frame is formed by a window frame sash of a sash type. The window frame sash 220 that constitutes the window frame is formed separated from the door panel of the vehicle opening and closing doors (the front door, the rear door, or the like) and is fixed to the door panel. A run mounting concave portion 225 is formed at the window frame sash 220.

Similar to the first exemplary embodiment, a glass run channel 231 that is one of a plurality of glass run channels that configures the glass run channel assembly has a run channel main body 250 that forms the main part thereof. The run channel main body 250 has a base bottom portion 251 that is provided at a position facing the end surface of the windowpane (not shown), an exterior side wall portion 252, an interior side wall portion 253, an exterior seal lip 262, and an interior seal lip 265. The exterior seal lip 262 projects to the base bottom portion 251 from a top connecting portion 256 which is an opening side end of the exterior side wall portion 252. The interior seal lip 265 projects to the base bottom portion 251 from a top connecting portion 257 which is an opening side end of the interior side wall portion 253. The exterior seal lip 262 and the interior seal lip 265 elastically contact each surface of the windowpane respectively.

Further, in the run channel main body 250, an exterior decoration portion 267 projects from the top connecting portion 256, which is the opening side end of the exterior side wall portion 252, toward an opposite side of the exterior seal lip 262, and an interior decoration portion 268 projects from the top connecting portion 257, which is the opening side end of the interior side wall portion 253, toward an opposite side of the interior seal lip 265.

Similarly to the first exemplary embodiment, in the run channel main body 250, an exterior covering layer 267*a* is formed at a surface that is from an end portion of the exterior decoration portion 267 to the exterior connecting portion 256, so as to cover the surface, and an interior covering layer 268*a* is fanned at a surface that is from an end portion of the interior decoration portion 268 to the interior connecting portion 257, so as to cover the surface.

The exterior covering layer 267*a* of the exterior decoration portion 267 and the interior covering layer 268*a* of the interior decoration portion 268 are made of the second polymer material which has a foaming ratio smaller than that of the foamable polymer material that forms the run channel main body 250 or that is not foamed.

In the second exemplary embodiment, similarly to the first exemplary embodiment, the exterior covering layer 267*a* is formed extending in a folded shape beyond the end portion of the exterior decoration portion 267 to a rear surface, and the interior covering layer 268*a* is formed extending in a folded shape beyond the front end portion of the interior decoration portion 268 to a rear surface.

In the second exemplary embodiment, similarly to the first exemplary embodiment, an exterior low friction layer 263 is formed at a surface of the exterior seal lip 262 that contacts the windowpane, and an interior low friction layer 266 is formed at a surface of the interior seal lip 265 that contacts the windowpane. Both the low friction layers 263 and 266 are made of a low friction material, which is the same kind of material as the material of the run channel main body 250 or is miscible therewith, and a coefficient of kinetic friction of which, with respect to the windowpane or the door panel, is smaller than that of the foamable polymer material (the run channel main body 250) or the second polymer material (the exterior covering layer 267*a* and the interior covering layer 268*a*). The low friction layers 263 and 266 are formed by a co-extrusion with the extrusion molding of the run channel main body 250.

It is preferred that the exterior low friction layers 263 is continuous with the exterior covering layer 267*a*, and the interior low friction layer 266 is continuous with the interior covering layer 268*a*.

The low friction layers 252*a*, 253*a*, and 251*a* are made of a low friction material that has a coefficient of kinetic friction smaller than that of the material of the run channel main body 250, even at mutually facing surfaces of the exterior side wall portion 252 and the interior side wall portion 253, and a bottom surface of the base bottom portion 251. The low friction layers 252*a*, 253*a*, and 251*a* are simultaneously formed by a co-extrusion with the extrusion molding of the run channel main body 250.

A high friction layer 269, which contacts the bottom surface of the run mounting concave portion 225 and is made of a non-foamable (solid) material having a coefficient of static friction greater than that of the run channel main body 250, is formed at a bottom outer surface of the base bottom portion 251 by a coextrusion with the molding of the run channel main body 250.

The run channel main body 250 includes an exterior holding lip 260 having a lip shape and an interior holding lip 261 also having a lip shape. The exterior holding lip 260 is provided to the exterior side wall portion 252 outside of an end portion of the base bottom portion 251. The interior holding lip 261 is provided to the interior side wall portion 253 outside of another end portion of the base bottom portion. The exterior holding lip 260 and the interior holding lip 261 are inclined and projected from the exterior side wall portion 252 and the interior side wall portion 253 respectively. Further, the exterior holding lip 260 and the interior holding lip 261 are elastically engaged and retained to an exterior step portion 213a and an interior step portion 214a of the window frame 220 respectively.

The run channel main body 250 is made of the thermoplastic elastomer material and the foamable polymer material that includes thermal expansion capsules 59, 259, and has countless foaming cells which are formed by the expansion of the thermal expansion capsules 59; 259.

Other configurations of the second exemplary embodiment are configured in the same manner as that of the first exemplary embodiment so that descriptions thereof are omitted.

Thus, in the second exemplary embodiment, it is possible to achieve the same effect as can be achieved from the first exemplary embodiment.

While the present invention has been showed and described with reference to the first and second exemplary embodiment, it will be understood by those skilled in the art that various changes in form and details may be made therein without departing from the spirit and scope of the invention.

For example, in the first exemplary embodiment and the second exemplary embodiment, both the exterior covering layer 67a, 267a and the interior covering layer 68a, 268a are formed to the glass run channel. However, the same effect as that of the first exemplary embodiment and the second exemplary embodiment can be achieved even when either one of the exterior covering layer 67a, 267a and the interior covering layer 68a, 268a is formed to the glass run channel.

Further, in the first exemplary embodiment and the second exemplary embodiment, the exterior covering layer 67a, 267a is formed at the surface that is from the end portion of the exterior decoration portion 67, 267 to the exterior connecting portion 56, 256, so as to cover the surface. However, the same effect as that of the first exemplary embodiment and the second exemplary embodiment can be achieved even when the exterior covering layer 67a, 267a is formed at the surface of the exterior decoration portion 67, 267 only. Further, in the first exemplary embodiment and the second exemplary embodiment the interior covering layer 68a, 268a is formed at the surface that is from the end portion of the interior decoration portion 68, 268 to the interior connecting portion 57, 257, so as to cover the surface. However, the same effect as that of the first exemplary embodiment and the second exemplary embodiment can be achieved even when the interior covering layer 68a, 268a is formed at the surface of the interior decoration portion 68, 268 only.

The present invention provides illustrative, non-limiting aspects as follows:

(1) According to a first aspect, there is provided a glass run channel having an elongated shape, which is mounted on a run mounting portion of a window frame of a vehicle door, guides moving up and down of a windowpane and is made of a polymer material, the glass run channel comprising: a run channel main body that forms a main part of the glass run channel, the run channel main body including, a base bottom portion which is provided at a position facing an end surface of the windowpane, an interior side wall portion which extends from a width end of the base bottom portion, an exterior side wall portion which extends from another width end of the base bottom portion, an interior seal lip which project toward the base bottom portion from an opening side end of the interior side wall portion and elastically contacts a first surface of the windowpane, an exterior seal lip which project toward the base bottom portion from an opening side end of the exterior side wall portion and elastically contacts a second surface of the windowpane, an interior decoration portion which project from the opening side end of the interior side wall portion toward an opposite side of the interior seal lip, and an exterior decoration portion which project from the opening side end of the exterior side wall portion toward an opposite side of the exterior seal lip, wherein at least one of the interior side wall portion and the exterior side wall portion is made of a foamable polymer material that is foamed, wherein an interior connecting portion connects the interior decoration portion and the interior seal lip, wherein an exterior connecting portion connects the exterior decoration portion and the exterior seal lip, wherein at least one of an interior covering layer that covers at least a portion of a first surface of the run channel main body, the first surface including a surface of the interior decoration portion and a surface of the interior connecting portion, and an exterior covering layer that covers at least a portion of a second surface of the run channel main body, the second surface including a surface of the exterior, decoration portion and a surface of the exterior connecting portion, is formed, so as to cover the at least one decoration portion that is made of the foamable polymer material, and wherein the at least one covering layer is made of a second polymer material which has a foaming ratio smaller than that of the foamable polymer material or which is not foamed.

According to this configuration, the at least one covering layer, which is made of the second polymer material which has a foaming ratio smaller than that of the foamable polymer material or which is not foamed, is formed to at least one surface of the interior and the exterior the decoration portions which are made of the foamable polymer material. Thus, the decoration portion to which the covering layer is formed can be suppressed from being deformed in the opening direction.

(2) According to a second aspect, there is provided the glass run channel according to the first aspect, wherein the foaming ratio of the run channel main body that is made of the foamable polymer material is 1.20 to 1.80.

According to this configuration, the foaming ratio of the run channel main body is set to 1.20 to 1.80 so that the deformation of the decoration portions including the covering layers in the opening direction can be satisfactorily suppressed.

(3) According to a third aspect, there is provided the glass run channel according to the first or second aspect, wherein the foamable polymer material includes 100 parts by weight of a thermoplastic elastomer material and 0.5 to 2.0 parts by weight of thermal expansion capsules 59, 259.

According to this configuration, a reduction in weight can be satisfactorily achieved. That is, if the thermal expansion capsules 59, 259 are less than 0.5 parts by weight, the effect of the reduction in the weight decreases. Meanwhile, if the thermal expansion capsules 59, 259 are more than 2.0 parts by weight, there is concern that the capsules will become an excessively foamed state so that the rigidity, tensile strength, and the like decreases.

(4) According to a fourth aspect, there is provided the glass run channel according to the third aspect, wherein the foamable polymer material includes 100 parts by weight of the thermoplastic elastomer material and 1.0 part by weight of the thermal expansion capsules 59, 259.

According to this configuration, the weight reduction effect increases.

(5) According to a fifth aspect, there is provided the glass run channel according to any one of the first to fourth aspect, wherein the at least one covering layer extends beyond an end portion of the corresponding decoration portion to a rear surface.

According to the configuration, the at least one covering layer extend beyond the front end portion of the corresponding decoration portion to the rear surface so that the decoration surfaces of the decoration portions (the surfaces which are visible from the interior or the exterior of the vehicle when the windowpane is closed) can be configured by the covering layers and the visual quality can be satisfactorily maintained.

(6) According to a sixth aspect, there is provided the glass run channel according to any one of the first to fifth aspect, wherein an interior low friction layer made of a low friction material is formed at a portion of the interior seal lip that contacts the windowpane, and an exterior low friction layer made of the low friction material is formed at a portion of the exterior seal lip that contacts the windowpane, wherein the low friction material has a coefficient of kinetic friction with respect to the windowpane or the door panel smaller than that of the foamable polymer material or the second polymer material, and wherein the interior low friction layer extends to a root portion of the interior seal lip, and the exterior low friction layer extends to a root portion of the exterior seal lip.

According to this configuration, the friction force can be decreased by low friction layers that are formed at the portion of both the interior and the exterior seal lips that contact the windowpane when the windowpane is moving up and down. As a result, the stress applied to the glass run channel when the windowpane is moving up and down can be decreased. The deformation of the interior and the exterior decoration portions including the covering layers can be more satisfactorily suppressed.

(7) According to a seventh aspect, there is provided the glass run channel according to the sixth aspect, wherein at least one of the interior low friction layer and the exterior low friction layer is continuous with at least one of the interior covering layer and the exterior covering layer.

According to this configuration, at least one of the interior low friction layer and the exterior low friction layer is continuous with at least one of the interior covering layer and the exterior covering layer so that the decoration surface having a good visual quality can be configured.

(8) According to an eighth aspect, there is provided the glass run channel according to any one of the first to seventh aspect, wherein a hardness of the run channel main body that is made of a foamable polymer material after being foamed and a hardness of the at least one covering layer that is made of the second polymer material are substantially the same degree.

According to this configuration, since the hardness of the run channel main body and the at least one covering layer is substantially the same as each other, the rigidity is not lowered even though the run channel main body is made of a foamable polymer material. Thus, the deformation of the at least one decoration portion including the at least one covering layer in the opening direction can be highly prevented.

(9) According to a ninth aspect, there is provided the glass run channel according to any one of the first to eighth aspect, wherein the hardness of the at least one covering layer that is made of the second polymer material has a JISA hardness of 60 to 80.

According to this configuration, the JIS hardness (JIS K6253 of type A durometer hardness) of the at least one covering layer is A60 to A80, so that the at least one covering layer is not easily whitened and wrinkles are not easily formed. Thus, the decoration surfaces are satisfactorily maintained for a long period and the durability is excellent.

That is, if hardness of the covering layer is higher than JIS A80, the surfaces of the covering layers are easily whitened, and if hardness of the covering layer is lower than JIS A60, there is a defect in which wrinkles are easily formed on the surfaces of the covering layers. However, the above-described defect does not occur in the glass run channel according to the ninth aspect.

(10) According to a tenth aspect, there is provided the glass run channel according to any one of the first to ninth aspect, wherein both the interior covering layer that covers the first surface and the exterior cover layer that covers the second surface are formed.

According to this configuration, the covering layers which are made of the second polymer material of which the foaming ratio is smaller than that of the foamable polymer material or which is not foamed, are formed on both the at least a portion of the surface of the interior decoration portion and the surface of the interior connecting portion and the at least a portion of the surface of the exterior decoration portion and the surface of the exterior connecting portion. Thus, the deformation of both the interior and the exterior decoration portions including the covering layers in the opening direction can be suppressed.

What is claimed is:
1. A glass run channel having an elongated shape, which is mounted on a run mounting portion of a window frame of a vehicle door, guides moving up and down of a windowpane and is made of a polymer material, the glass run channel comprising:
 a run channel main body that forms a main part of the glass run channel, the run channel main body including,
  a base bottom portion which is provided at a position facing an end surface of the windowpane,
  an interior side wall portion which extends from a width end of the base bottom portion,
  an exterior side wall portion which extends from another width end of the base bottom portion,
  an interior seal lip which projects toward the base bottom portion from an opening side end of the interior side wall portion and elastically contacts a first surface of the windowpane,
  an exterior seal lip which projects toward the base bottom portion from an opening side end of the exterior side wall portion and elastically contacts a second surface of the windowpane,
  an interior decoration portion which projects from the opening side end of the interior side wall portion toward an opposite side of the interior seal lip, and
  an exterior decoration portion which projects from the opening side end of the exterior side wall portion toward an opposite side of the exterior seal lip,
 wherein at least one of the interior side wall portion and the exterior side wall portion is made of a foamed polymer material,
 wherein an interior connecting portion connects the interior decoration portion and the interior seal lip,
 wherein an exterior connecting portion connects the exterior decoration portion and the exterior seal lip,
 wherein at least one of an interior covering layer that covers at least a portion of a first surface of the run channel main body, the first surface including a surface of the interior decoration portion and a surface of the interior connecting portion, and an exterior covering layer that covers at least a portion of a second surface of the run channel main body, the second surface including a surface of the exterior decoration portion and a surface of the exterior connecting portion, is formed, so as to cover a portion of the at least one decoration portion that is made of the foamed polymer material, and wherein the at least one covering layer is made of a second polymer material which has a foaming ratio smaller than that of the foamed polymer material or which is not foamed.

2. The glass run channel according to claim 1, wherein the foaming ratio of the run channel main body that is made of the foamable polymer material is 1.20 to 1.80.

3. The glass run channel according to claim 1, wherein the foamable polymer material includes 100 parts by weight of a thermoplastic elastomer material and 0.5 to 2.0 parts by weight of thermal expansion capsules.

4. The glass run channel according to claim 3, wherein the foamable polymer material includes 100 parts by weight of the thermoplastic elastomer material and 1.0 part by weight of the thermal expansion capsules.

5. The glass run channel according to claim 1, wherein the at least one covering layer extends beyond an end portion of the corresponding decoration portion to a rear surface.

6. The glass run channel according to claim 1, wherein an interior low friction layer made of a low friction material is formed at a portion of the interior seal lip that contacts the windowpane, and an exterior low friction layer made of the low friction material is formed at a portion of the exterior seal lip that contacts the windowpane, wherein the low friction material has a coefficient of kinetic friction with respect to the windowpane or the door panel smaller than that of the foamable polymer material or the second polymer material, and wherein the interior low friction layer extends to a root portion of the interior seal lip, and the exterior low friction layer extends to a root portion of the exterior seal lip.

7. The glass run channel according to claim 6, wherein at least one of the interior low friction layer and the exterior low friction layer is continuous with at least one of the interior covering layer and the exterior covering layer.

8. The glass run channel according to claim 1, wherein a hardness of the run channel main body that is made of a foamable polymer material after being foamed and a hardness of the at least one covering layer that is made of the second polymer material are substantially the same degree.

9. The glass run channel according to claim 1, wherein the hardness of the at least one covering layer that is made of the second polymer material has a JISA hardness of 60 to 80.

10. The glass run channel according to claim 1, wherein the glass run channel includes both the interior covering layer that covers the first surface and also the exterior cover layer that covers the second surface.

* * * * *